July 14, 1931. V. G. ELLEN 1,814,744
AUTOMOBILE HEATING SYSTEM AND HEATER
Filed Aug. 11, 1928  3 Sheets-Sheet 1

Inventor
VERNER G. ELLEN
By Paul, Paul & Moore
ATTORNEYS

July 14, 1931. V. G. ELLEN 1,814,744
AUTOMOBILE HEATING SYSTEM AND HEATER
Filed Aug. 11, 1928   3 Sheets-Sheet 2

Inventor
VERNER G. ELLEN

ATTORNEYS

July 14, 1931.  V. G. ELLEN  1,814,744

AUTOMOBILE HEATING SYSTEM AND HEATER

Filed Aug. 11, 1928   3 Sheets-Sheet 3

Inventor
VERNER G. ELLEN

By Paul, Paul & Moore
ATTORNEYS

Patented July 14, 1931

1,814,744

UNITED STATES PATENT OFFICE

VERNER G. ELLEN, OF MINNEAPOLIS, MINNESOTA

AUTOMOBILE HEATING SYSTEM AND HEATER

Application filed August 11, 1928. Serial No. 298,960.

This invention relates to improvements in heating systems, and is particularly concerned with such a system applied to an automobile.

The invention contemplates constructions and arrangements which can be applied to any make of automobile, and to any type of system, for example to thermo-siphon systems as well as pumping systems.

Objects of this invention are to arrange two radiator systems, and to so connect and balance their water circulating elements that while the engine is running proper circulation is maintained to cool the engine, while at the same time sufficient hot water is diverted to warm air passing through an auxiliary radiator to adequately heat the passenger compartment, and to accomplish these results in either thermo-siphon or pump systems.

Other objects are to so connect the two systems that heat may be applied to the auxiliary radiator, in a manner to create a circulation through the radiators and circulating connections of both systems, so that the engine, when not running, may be maintained in a sufficiently warm condition to prevent freezing of the lubricating material, and to generally maintain the engine in a better condition for starting.

Features and advantages will be set forth in the description of the drawings forming a part of this application and in said drawings Figure 1 is an elevation partly in section showing an application of the invention to an automobile;

Figures 1, 5:
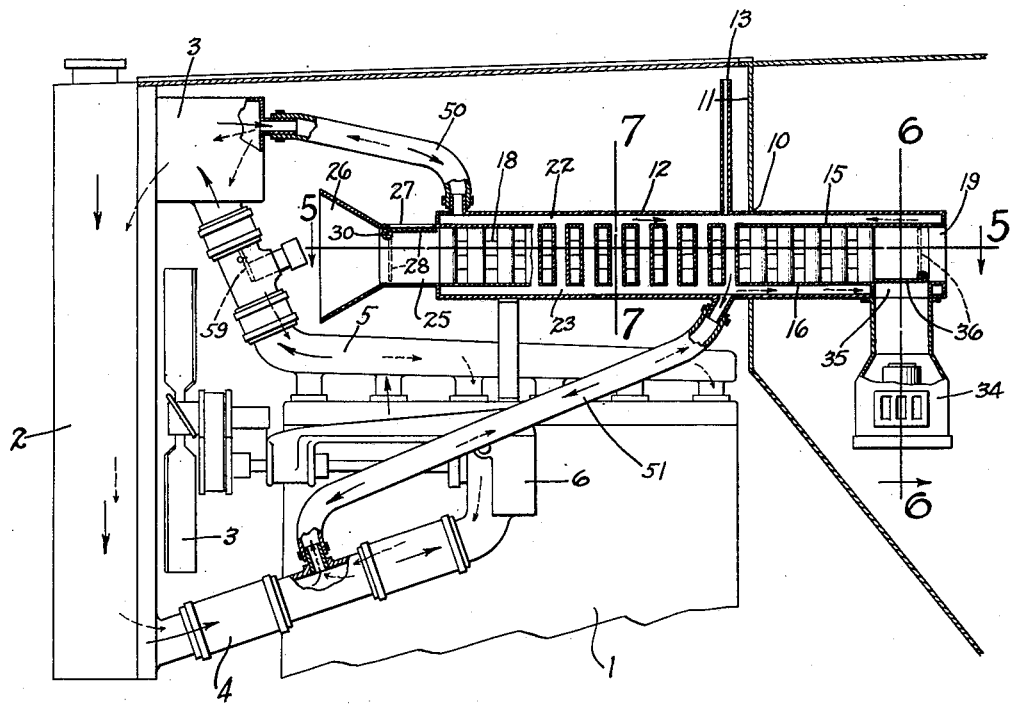
Figure 5 is a horizontal section through the radiator, on line 5—5 of Figure 1.

An engine is diagrammatically indicated at 1, the radiator at 2, fan at 3, the bottom radiator connection with the engine at 4, and the top radiator connection with the engine at 5. In Figure 1, a pump is diagrammatically indicated at 6. It is to be understood, however, that the invention can be applied either to a pumping or a thermo-siphon system.

Arranged horizontally and passing through an opening 10 in the partition 11 which divides the car from the engine compartment, is an elongated radiator generally indicated at 12. The arrangement of the radiator and its construction are both considered features of the invention.

The construction of the radiator is best shown in Figures 1, 5, 6 and 7. This radiator has the following parts: An elongated air conduit crossed by tubes spaced to permit circulation of air through the channel, upper and lower water circulating chambers communicating with each other through the tubular members, a flue in communication with the air conduit, through which flue heat is applied to heat the water in the tubes when the engine is not running, and a valve or valves for controlling the circulation of air through the air conduit in opposite directions respectively when a current of air is being forced through the conduit by the fan, and when the current is being forced in an opposite direction by means of a heating apparatus.

The details of construction of the radiator are claimed although the above parts, channels, tubes and chambers and their arrangement constitute the important feature. Upper and lower plates are indicated at 15—16 and between these plates perpendicular thereto are a series of tubes arranged substantially in the manner shown in Figure 5 to permit circulation of air horizontally. Additional plates are indicated at 18 which act to divide the air stream, and facilitate conduction. The plates 15—16 are extended forwardly and other parts are added to provide a chamber 25 merging into a forwardly divergently flared funnel section 26, which funnel is positioned to receive air from the fan 3, when the engine is running. The upper wall of the chamber 25 is provided with a vent opening 27 which provides for the escape of gases when the car heating apparatus is used, as when the engine is not running. This vent opening 27 as well as the air channel of the heater is controlled by the valve 28 arranged to swing on a horizontal journal 30, and arranged to alternately close the opening, and close the air passage. In Figure 1 the valve is shown closing the opening 27, which is the normal position when the engine is running, permitting air to be blown rearwardly and horizontally through the air channel of the radiator.

Figure 2:
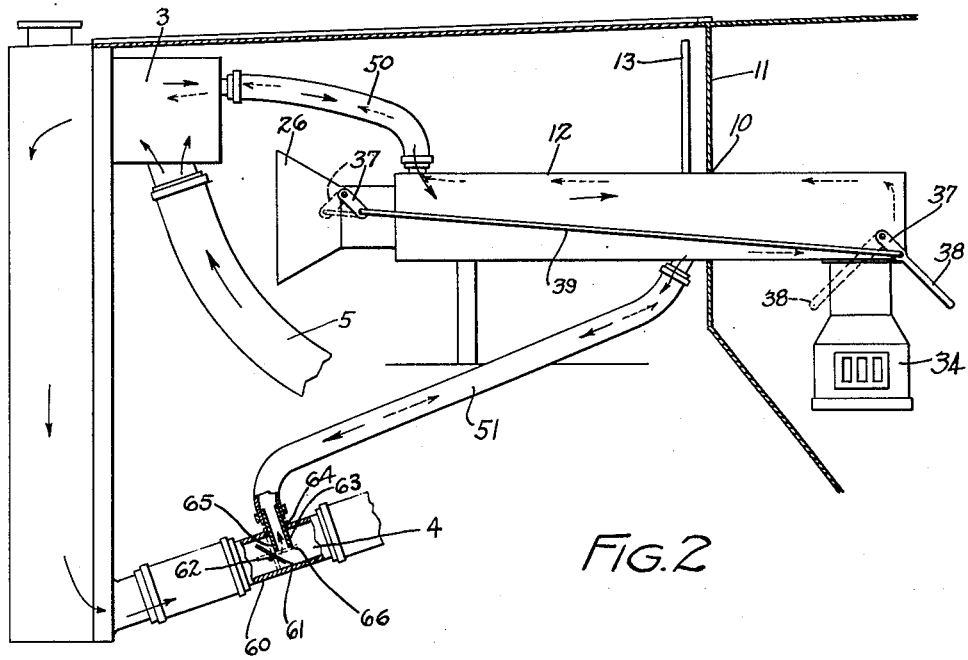
Figure 2 shows a modification in which a valve is used in the main circulating system for diverting hot water into the auxiliary circulating system.
Figure 6:
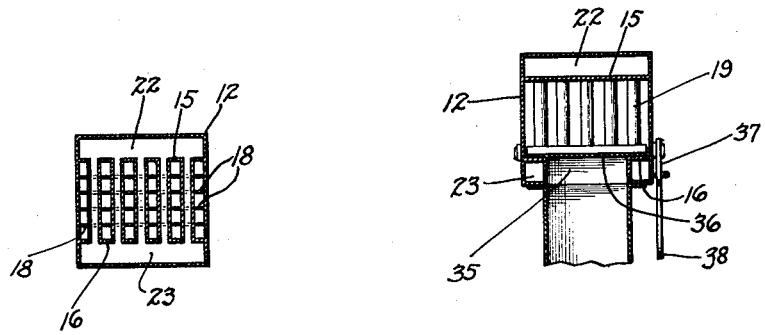
Figure 6 is a vertical section through the radiator on line 6—6 of Figure 1.

The opposite end of the casing projects into the car as shown, and is provided in its lower portion with a vertical flue or conduit 35 leading upwardly and communicating with the main air channel which is crossed by the tubes. A heating device 34 is arranged so as to deliver upwardly through this channel into the air channel. As shown in Figure 6, water in the lower chamber 23 may circulate around the flue 35, and the extreme ends of the water chambers 22—23 are connected by tubes 19, at a point inwardly beyond the air channel 35. A valve 36 controls the entrance of hot air upwardly through the channel 35, and this valve is normally closed as shown in Figure 1 when the engine is running to permit escape of heat into the passenger compartment. As shown in Figure 2, each valve is operable by a lever 37 lying at the outside of the radiator casing. That lever 37 which lies within the passenger compartment has a handle 38. The levers are connected for movement in unison by a rod 39, and are further connected so that the valve 28 will always close the vent opening 27 when the valve 36 is closing the flue 35, and so that when the valve 28 occupies the position shown in dotted lines in Figure 1, the valve 36 will occupy the position also shown in dotted lines. In this instance the limit positions of each valve are perpendicular to one another. Thus, in one position, air cannot pass completely through the air conduit, and in the other position this passage is permitted.

In addition to the construction of the radiator as a feature of the invention, the arrangement of the conduits of the water circulating system of the engine is such that said system may operate normally when the engine is running, and so that the system may be warmed when the engine is not running, is also claimed. There is no intention to be limited to the particular construction although each embodiment of the invention is claimed.

The top water chamber 22 of the auxiliary radiator is connected by a conduit 50 with the uppermost portion of the main radiator, the point of connection of this conduit with the main radiator being at a level above its point of connection with the auxiliary radiator. Connection from the conduit 4 of the main circulating system is made with the lower chamber 23 of the auxiliary radiator by means of a conduit 51. The connection between the upper part of the engine and the upper part of the main radiator is generally indicated at 5 and sometimes includes a valve generally indicated at 59. This valve, although shown, is not always necessary, as will be explained. In fact in an ordinary thermo-siphon system it is found that proper operation results without the use of the valve. In a system where a pump is used the valve is used to advantage.

The connections between the circulating portions of the main radiator system, and the circulating portions of the auxiliary radiator are made by means of a coupling which is a valve unit and comprises a short length of tubing 60 over the ends of which are slipped the ordinary rubber connections. Suitable clamps are employed to secure the rubber connections to the tube. Within this casing is a damper-like valve 61 secured to a pivot bar 62 which is arranged diametrically of the casing. A branch connection or pipe 63 extends through the wall of the tube 60 and is suitably secured and packed as at 64. The axis of this tube is arranged substantially perpendicular to the axis of rotation 62 of the damper 61. The valve 61 is arranged so that when it is in a position to close the tube 60 it engages the side 65 of the tube 63 as a stop. In its fully open position it engages the end 66 of the tube 63 as a stop. This is shown in dotted lines. At an intermediate position, the valve acts to divert a portion of the main stream into the tube 63.

In the embodiment of the invention shown in Figure 1, the full line arrows suggest the circulation when the engine is running, while the dotted arrows suggest the circulation when the engine is not running and when the heating device 34 is operating, with the valves 28 and 36 in the dotted line position. It will be understood that the distribution may not strictly correspond to the course indicated by the arrows, and no limitation is intended.

When the engine is running, fan 3 will blow air rearwardly through the air chamber of the auxiliary radiator into the car, and this air will be warmed during its passage through the auxiliary radiator. When the engine is not running the valves 28 and 36 will be moved to the dotted line position, the heater 34 will be started and will furnish sufficient heat for the car, while at the same time the water tubes will be heated during passage of the heated air in a direction toward the main radiator and out through the vent 27.

Figure 2 indicates one embodiment of the invention as applied to a pumping system in which a valve is used in the lower part of the system. The valve is indicated at 61 and is positioned substantially as shown. The direction of circulation during operation of the engine is suggested by the full line arrows while the circulation when the heater 34 is operating is suggested by the dotted line arrows. The valve is arranged so that it may close or cap the extension 63 and the valve is also arranged so that it cannot completely close the passage 4 leading from the bottom of the radiator to the engine. However, some leakage is provided for, for both limit positions of the valve. It will be understood that the valves are not positively necessary in thermo-siphon systems. The embodiment shown in Figure 2 is applicable to either thermo-siphon or pump systems.

Figure 3:
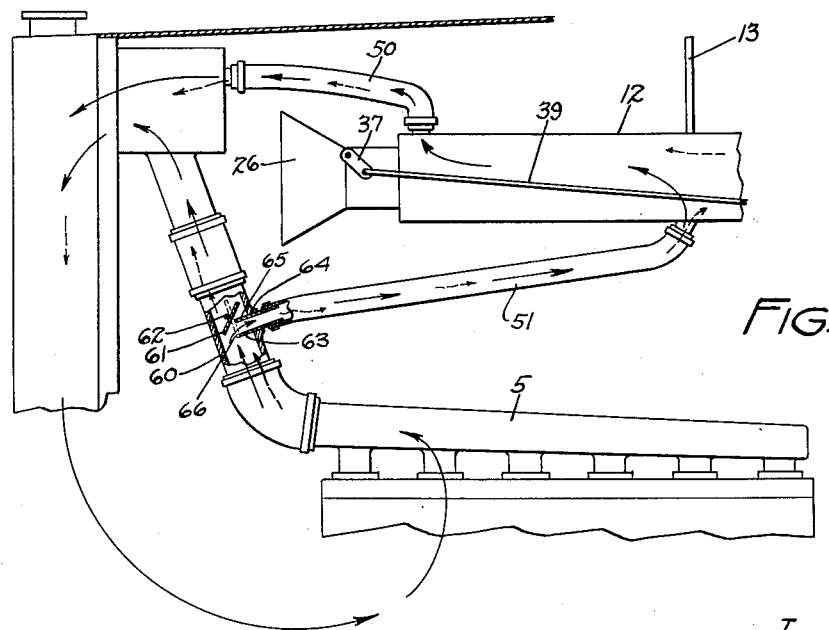
Figure 3 is a modification in which a valve is used to divert the water at another and higher portion of the main circulating system.

It will be understood that in pump systems where there is a high velocity of travel of the liquid in the small conduits, some means should be provided for trapping or diverging sufficient hot water from the main system for heating the car, and under some conditions the water is taken from the highest point just after it leaves the manifold, and is led into the heater in the manner shown in Figure 3 by the use of a valve positioned as shown. It will be understood that the general object of the valves is to divert some of the hot water and lead it to the top of the heater without cooling it by passage through the main radiator.

Figure 4:
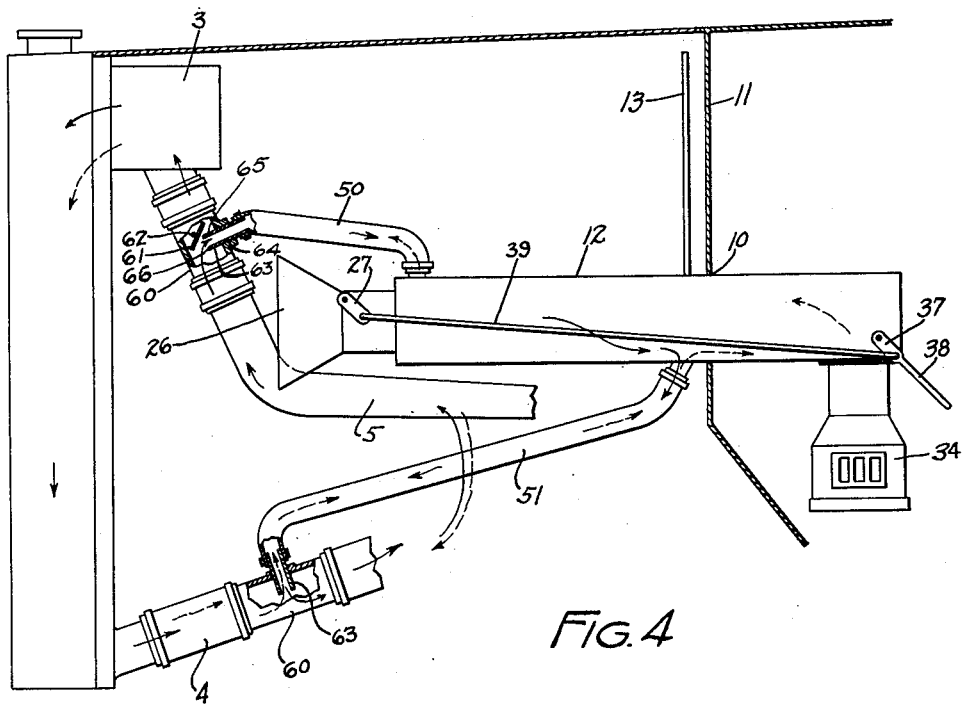
Figure 4 is a view generally similar to Figures 2 and 3 showing another position of the valve.
Figure 7:
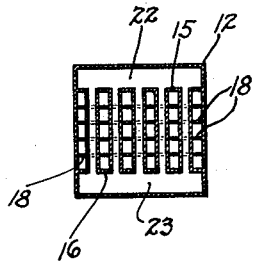
Figure 7 is a vertical section through a mid-portion of the radiator on line 7—7 of Figure 1.

In case the top of the main radiator is sufficiently higher than the top of the auxiliary radiator connection can be made as shown in Figure 4. In a pump system, a valve can be used either in the upper or lower part of the system, and when below, at some point between the lower main radiator connection and the pump.

A vent pipe 13 is for release of steam and pocketed air.

In order that the system properly operate when the heater 34 is being used, the connection 50 must be inclined upwardly from its point of connection with the auxiliary radiator, or at least this connection must never slant downwardly.

In Figure 2 when a pump is used and is operating the circulation will be substantially as shown by full line arrows, and when the element 34 is acting the circulating will take place substantially as shown by the dotted arrows in Figure 1.

In Figure 3 when a pump is used and when it is operating the circulation will be substantially as shown by the full line arrows, and when the element 34 is operating circulation will be substantially as shown by the dotted arrows. Note that in both instances the valve 61 diverts water into the tube 51.

It is to be further noted that at present it seems that the best results using the burner 34 requires that the cold water intake 51 be at the lowest possible level with reference to the main radiator 2.

It will be understood that the connection shown in Figure 4 is made to avoid any special modification or connection at the portion 3 of the radiator 2. In this form the circulation with or without a pump is represented substantially by the black arrows, and when the heater is operating the direction is indicated by the dotted arrows.

It will be understood that the intention herein is to provide a heating system in which proper circulation can be had for the purposes in hand, when the engine is running and when there is no pump; when the engine is not running and when there no pump; when the engine is running and when there is a pump used; and when the engine is not running and when there is a pump.

Generally speaking, a valve is only valuable in a pumping system, although under some conditions it may be helpful in a thermo-siphon system.

There is no intention to be limited by the arrows, which are suggestions, and only represent what is believed by the inventor to take place, as the result of experiments thus far performed.

Generally speaking, the cold water will always be seeking the lowest level in the system, while the hot water will seek the highest level. When the engine is running the general trend of heat will be upwardly because it is being generated by the engine. However, when the heater 34 is operating the trend will be generally downwardly.

In Figure 1 when the heater 34 is operating it is believed that the currents will generally take the direction of the dotted arrows and currents traveling in opposite direction at the lower part of the system will eventually enter the tube 51 to return to the hottest and highest part of the system at 34.

It will be understood that although the system may be operated to prevent freezing of the water therein, this is ordinarily accomplished by the use of some anti-freezing compound. Therefore, it is desirable to principally maintain a warm circulation through the engine, when it is not running, rather than through the main radiator and engine. It will of course be understood that there must necessarily be a certain amount of warm water which passes through the main radiator, during that period when the engine is not running, and when the hot water circulation is being produced by some auxiliary heating means in the passenger compartment. Of course, it is not positively necessary that the heating means be within this compartment, but it is convenient to arrange it under the cowl in said compartment. A valve can be used, to assist in diverting hot water into the auxiliary radiator system, and is more desirable in a pumping system than in a thermo-siphon system. It will be further understood that this valve may be located in the connection between the upper part of the engine and the upper part of the main radiator as shown in Figures 1, 3 and 4, or in the return line from the main radiator to the engine as shown in Figure 2. It will be further understood that both systems may be operated without a valve. There is therefore no intention herein to be limited to the use of valves although the use of a valve in applicant's combination of radiator systems, main and/or auxiliary, is claimed.

I claim as my invention:

1. In combination with an automobile including a passenger compartment, an engine, radiator, and conduits for obtaining circulation of water through the engine and radiator, and an auxiliary radiator including an air conduit delivering into the passenger compartment, and water circulating conduits arranged to warm air passing through the air conduit, branch connections between the water circulating conduits of the engine and said auxiliary radiator arranged to obtain circulation of heated water through the auxiliary radiator when the engine is running, and a heater connected and arranged to circulate hot air through the air conduit of the auxiliary radiator to establish water circulation in both radiator systems when the engine is not running.

2. In combination with an automobile including a passenger compartment, an engine, radiator, and conduits for obtaining circulation of water through the engine and radiator, an auxiliary radiator including an air conduit delivering into the passenger compartment, and water circulating conduits arranged to warm air passing through the conduit, branch connections between the water circulating conduits of the engine and said auxiliary radiator, arranged to obtain circulation of heated water through the auxiliary radiator when the engine is running, and a heater connected and arranged to circulate hot air through the air conduit of the auxiliary radiator and to establish water circulation in both radiator systems when the engine is not running, and to heat the passenger compartment of the automobile.

3. In combination with automobile including a passenger compartment, an engine, radiator, and conduits for obtaining circulation of water through the engine and radiator, and an auxiliary radiator including an air conduit delivering into the passenger compartment, water circulating conduits arranged to warm air passing through the conduit, branch connections between the water circulating conduits of the engine, and said auxiliary radiator arranged to obtain circulation of heated water through the auxiliary radiator when the engine is running, and a heater connected and arranged to circulate hot air through the air conduit of the auxiliary radiator and to heat the passenger compartment of the automobile, and valves adapted to facilitate circulation of hot air through said auxiliary air conduit.

4. In combination with an automobile including a passenger compartment, an engine, radiator, fan, and conduits for obtaining circulation of water through the engine and radiator, and an auxiliary radiator including an air conduit extending into the passenger compartment and arranged so that the fan will drive air therethrough into the compartment, water circulating conduits arranged to warm air passing through the air conduit, branch connections between the water circulating conduits of the engine and said auxiliary radiator arranged to obtain circulation of a portion of the heated water through the auxiliary radiator, when the engine is running, and a heater connected and arranged to circulate hot air through the air conduit of the auxiliary radiator, to establish water circulation in both radiator systems when the engine is not running.

5. In combination with an automobile including a passenger compartment, an engine compartment, an engine, a radiator, a fan for the radiator and conduits for obtaining circulation of water through the engine and radiator, an auxiliary radiator lying within the engine compartment and extending into the passenger compartment, including a horizontally arranged air circulating conduit leading entirely therethrough and opening into both compartments and further including upper and lower water circulating compartments connected by vertical tubes which pass through the air conduit, circulating conduits connecting the water circulating portion of the auxiliary radiator with the corresponding portion of the circulating system of the engine, and heating means connected and arranged to circulate hot air through the air conduit of the auxiliary radiator toward the first mentioned radiator.

6. A radiator having an elongated air conduit, means forming upper and lower water circulating chambers at opposite sides of said conduit, tubes traversing the air conduit and establishing communication between the water chambers, a pipe for each water chamber leading outwardly therefrom, one at the upper water chamber and the other at the lower chamber, a flue remote from said outwardly leading pipes and adjacent one end of the radiator and leading upwardly and communicating with the air conduit, and arranged so that water in the lower chamber may circulate around it to the extreme end of the radiator, said air conduit having a fume exit opening at a point outwardly beyond the tubes at the opposite end of the radiator.

7. A radiator having an elongated air conduit, means forming upper and lower water circulating chambers at opposite sides of said conduit, tubes traversing the air conduit and establishing communication between the water chambers, a pipe for each water chamber leading outwardly therefrom, one at the extremity of the upper water chamber and the other intermediately of the ends of the lower chamber, a flue remote from said outwardly leading pipes and adjacent one end of the radiator and communicating with the air conduit, and arranged so that water in the lower chamber may circulate around it to the extreme end of the radiator, said air conduit having a fume exit opening at a point outwardly beyond the tubes at the opposite end of the radiator, a valve arranged to alternately control air flow through said fume outlet and said air conduit, and a second valve arranged to alternately control air circulation through said flue, and said conduit.

8. A radiator comprising a single elongated air conduit, plates dividing said air conduit horizontally, upper and lower chambers at opposite sides of said conduit, tubes traversing the conduit and plates, and establishing communication between the chambers but permitting a horizontal air current to pass completely through the air conduit, a pipe for each water chamber leading outwardly therefrom, a hot air inlet conduit leading upwardly and communicating with said air conduit adjacent one end of the radiator and passing through the lower water compartment but not obstructing the circulation therein, a valve arranged to close the last mentioned conduit when in one position and when in another position to prevent admission of air at that end of the elongated air conduit which is adjacent the valve, said first mentioned conduit having a fume outlet arranged beyond the tubes and at that end opposite the hot air inlet conduit, and a second valve arranged in one position to close the fume outlet and in another to close said first mentioned conduit and to divert the air through said fume outlet, and connections between the valves such that the valves automatically move one another respectively to prevent travel of the air completely through said first mentioned conduit from end to end, and to permit such travel.

9. A radiator having a single elongated air conduit, plates dividing the air conduit horizontally, chambers at opposite sides of said conduit, tubes traversing the air conduit and plates and establishing communication between the water compartments, a pipe leading from each water compartment, an air passage adjacent one end of the radiator leading upwardly through the bottom water compartment into the air compartment, said first mentioned air conduit having a fume opening leading upwardly therefrom at the opposite end of said radiator, and valves disposed in said air conduit each arranged to prevent passage of air through said air conduit when in one position and in another position to close said fume opening and hot air intake opening.

10. A radiator having an elongated conduit, water circulating chambers upper and lower at opposite sides of said conduit, tubes traversing the air conduit and establishing communication between the water chambers, a pipe for each water chamber leading outwardly therefrom, a flue remote from said outwardly leading pipes and adjacent one end of the radiator and leading upwardly and communicating with the air conduit, and arranged so that water in the lower chamber may circulate around it to the extreme end of the radiator, said air conduit having a fume exit opening at a point outwardly beyond the tubes at the opposite end of the radiator.

In witness whereof, I have hereunto set my hand this 3rd day of August, 1928.

VERNER G. ELLEN.